C. P. BAILEY.
Dumping-Wagon.

No. 10,441. Patented Jan. 24, 1854.

UNITED STATES PATENT OFFICE.

CHARLES P. BAILEY, OF ZANESVILLE, OHIO.

DUMPING-CAR.

Specification of Letters Patent No. 10,441, dated January 24, 1854.

*To all whom it may concern:*

Be it known that I, CHARLES P. BAILEY, of Zanesville, in the county of Muskingum and State of Ohio, have invented certain new and useful Improvements in Dumping Cars or Wagons; and I do hereby declare the following to be a full, clear, and exact description of the same, reference being had to the accompanying drawings, making a part thereof, in which—

Figure 2:
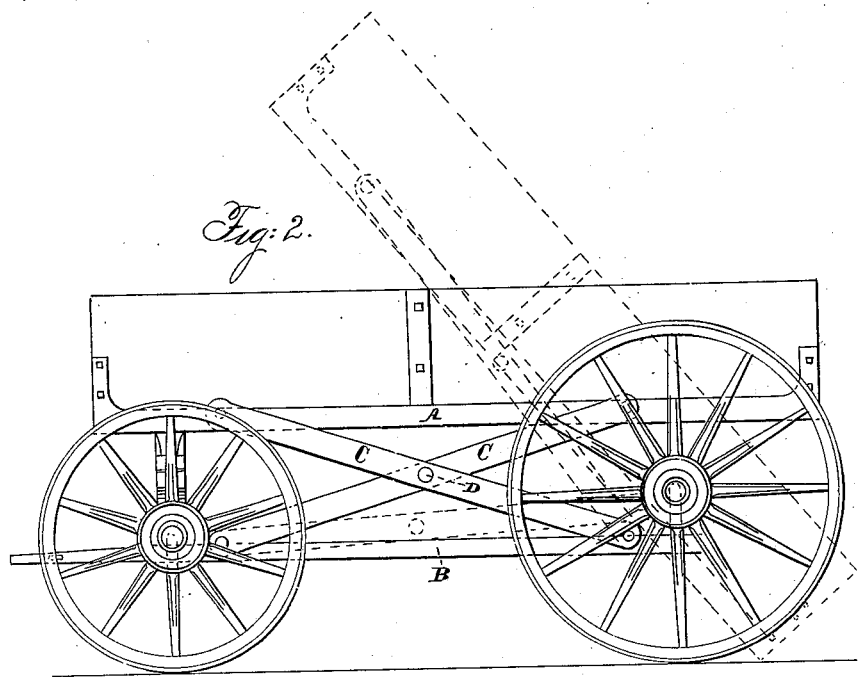
Figure 1:
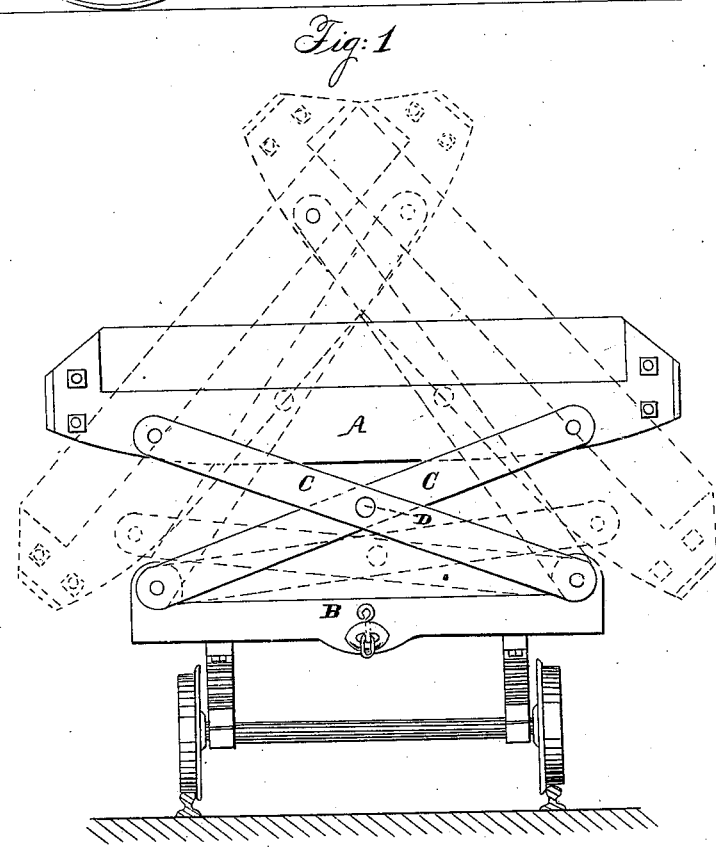

Figure 1, denotes an end view of a dumping car, and Fig. 2, denotes a side view of a dumping wagon.

Similar letters in both the figures denote like parts.

The nature of my invention consists in hanging, or so connecting, the bodies of dumping cars or wagons to the trucks, axles or bolsters by which they are usually supported, by means of transversely hinged braces or arms, as that said bodies may be held in a horizontal position, or dumped in either direction as may be desired, through said braces or arms, and still remain fastened to the wheels, axles or bolsters aforesaid.

To enable others skilled in the art to make and use my invention, I will proceed to describe the same with reference to the drawings.

A car truck (Fig. 1,) of any of the usual forms may be used, or a set of trucks, connected by springs or otherwise. The bed A of the car body may also be constructed in the usual well known manner, or may be slightly concave in the center, to lower the burthen and avoid the use of side boards. The pieces A, at each end of the body are connected to the bolsters B, of the trucks by diagonal cross braces or arms C, C, one end of each of which is hinged to the body or pieces A, the other ends hinged in a similar manner to the bolsters B. At the point where the two braces C, C, pass each other, should be made a hole D through each for the purpose of receiving a pin which will hold the body firm in its horizontal position; or a clamp of any kind may be used and serve a similar purpose without weakening the arms. When the pin is withdrawn the car body may be dumped to the right when the several parts will assume the positions indicated in blue lines; or it may be dumped to the left, when the several parts will assume the positions indicated by the red lines—the black lines indicating the position of the parts when retaining the load, and during all these positions the body is still firmly held to the trucks. If the burthens are very heavy, it may be necessary to attach a small windlass, or lever, for dumping the body more easily. But as it is generally known to which side the load is to be dumped when loading the car, the burthen may be placed more to that side.

In Fig. 2, I have represented the application of the same device to the dumping of a wagon—the only difference being that in the car the arms are placed across the body so as to dump sidewise, and in the other case (of the wagon) they are arranged parallel with the body so as to dump in rear of the wagon. To prevent the body from being elevated too high on the wheels of the wagon,—the hind-axle may be curved or bent downward so that the rear of the body may fall below a plane passing through the centers of the wheels. The red lines in Fig. 2, denote the position of the body of the wagon when dumped, as well as the position of the arms—the black lines denoting the position of the same parts when the body lies horizontal.

Having thus fully described the nature of my invention, what I claim therein as new and desire to secure by Letters Patent is—

Hanging or connecting the bodies of dumping cars or wagons to the trucks, axles, or bolsters which usually support the bodies of similar carriages, by means of hinged cross braces or arms, which pass transversely from end to end, or crosswise of the body as the case may be, one end of each of said arms or braces being hinged to the body and the other ends to the bearing or support beneath them, for the purpose of allowing said bodies to swing or dump either way, substantially as described.

CHAS. P. BAILEY.

Witnesses:
A. B. STOUGHTON,
SAML. GRUBB.